United States Patent [19]
Schwalbe

[11] 4,229,809
[45] Oct. 21, 1980

[54] ACOUSTIC UNDER SEA POSITION MEASUREMENT SYSTEM

[75] Inventor: Julian H. Schwalbe, Franklin Square, N.Y.

[73] Assignee: Sperry Corporation, New York, N.Y.

[21] Appl. No.: 7,001

[22] Filed: Jan. 29, 1979

[51] Int. Cl.² ........................... G01S 9/68; G01S 5/18
[52] U.S. Cl. ........................................ 367/6; 367/106
[58] Field of Search ........... 367/2, 6, 106 (U.S. only), 367/127 (U.S. only)

[56] References Cited

U.S. PATENT DOCUMENTS 3,860,900   1/1975   Scudder ................................. 367/6

*Primary Examiner*—Richard A. Farley
*Attorney, Agent, or Firm*—Howard P. Terry

[57] ABSTRACT

The invention concerns acoustic under-water measurement apparatus for determining the location with respect to a surface vessel of objects such as submersible vessels, pipe-riders, mining apparatus, or the like, including tethered submersible vessels. A receiver hydrophone set located on the tethered vehicle receives acoustic reply pulses from sea bottom transponders, telemetering the times of reception to a surface support ship via conductors in the tether cable. Signals obtained at the surface ship directly from the transponders and indirectly via the tether cable conductors are combined aboard the surface ship for computing the positions of both vessels with respect to a base line established by the sea bottom transponders. The system is self-calibrating, so that an expensive survey to determine the actual locations of the bottom transponders is no longer required.

38 Claims, 16 Drawing Figures

ACOUSTIC UNDER SEA POSITION MEASUREMENT SYSTEM

BACKGROUND OF THE INVENTION

1. Field of the Invention

The present invention relates generally to acoustic position measurement of the location of under-water objects such as submersible vehicles and more particularly concerns apparatus for the measurement of the position of a tethered submersible vessel with respect to a surface support ship.

2. Description of the Prior Art

Acoustic pulsed transponder communication systems have been successfully operated in the past in the under-water determination of the locations of objects with respect to reference stations. For example, under-water range information has been derived by generation of acoustic carrier pulses abroad a surface vessel, transponders replying with corresponding acoustic pulses of a carrier frequency spaced apart from that received. However, prior art systems often require a plurality of under-water transducers and their individual locations must be precisely determined by making time-consuming and otherwise expensive surveys to determine the horizontal separations of the transponders.

SUMMARY OF THE INVENTION

The invention concerns acoustic under-water measurement apparatus for determining the location with respect to a surface vessel of objects such as submersible vessels, pipe-riders, mining apparatus, or the like, including tethered submersible vessels. A receiver hydrophone set located on the tethered vehicle, for example, receives acoustic reply pulses from sea bottom transponders, telemetering the times of reception to a surface support ship via conductors in the tether cable. Signals obtained at the surface ship directly from the transponders and indirectly via the tether cable conductors are combined aboard the surface ship for computing the positions of both vessels with respect to a base line established by the sea bottom transponders. The system is self-calibrating, so that an expensive survey to determine the actual locations of the bottom transponders is no longer required.

DESCRIPTION OF THE PREFERRED EMBODIMENTS

Figure 1:
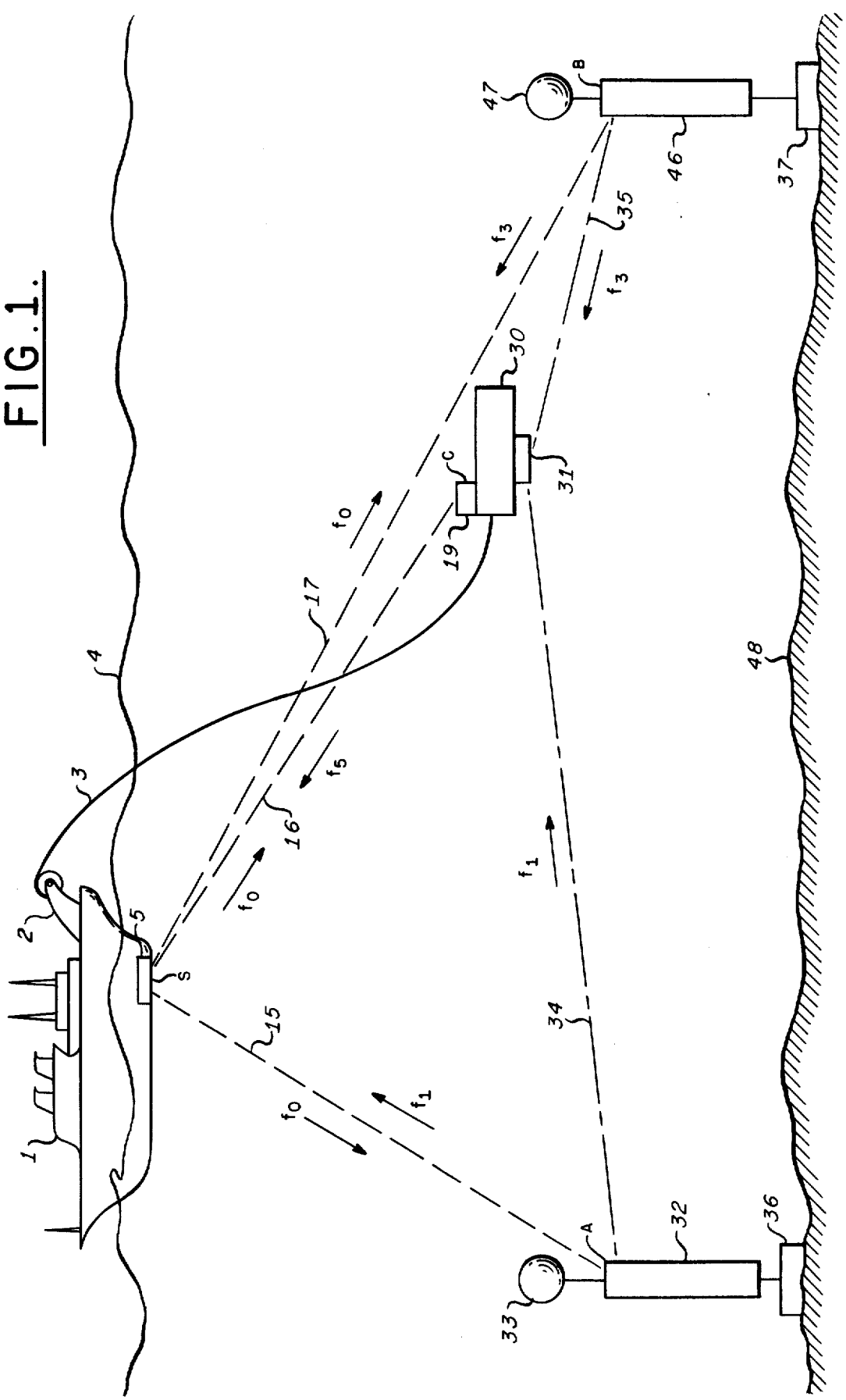
FIG. 1 is an elevation view showing the transponder system disposition with respect to the surface and submerged vessels.

FIG. 1 illustrates the basic measurement system and its method of operation in a particular marine application in which a submerged vessel 30 is tethered by a cable 3 from a conventional winch control mechanism 2 mounted aboard a surface support ship 1. Ship 1 is equipped with a conventional underwater-mounted sonic pulse interrogator and receiver 5 affixed at Station S on ship 1 for the downward radiation of energetic sound carrier pulses for wide-angle coverage about a generally vertical axis of the volume of sea between its surface 4 and the sea or other marine bottom 48. As noted in the foregoing, it is the object of the invention to identify the location of a submerged vessel or other cooperating object 30 with respect to ship 1 readily and with economy of time and apparatus.

For this purpose, a pair of identical pulsed carrier sound transponders 32 and 46 is employed in the vicinity in which the tethered vessel 30 is to be located adjacent the ocean bottom 48. Transponders 32, 46 may be of the generally conventional kind, including the usual pulse receiving and transmitting hydrophones associated respectively with a sonic receiver and a sonic pulsed carrier transmitter. Transponders 32, 46 are respectively connected to weights 36, 37 and are provided with respective floats 33, 47 by suitable connecting members so that the assemblies remain stably anchored and generally upright at the sea bottom 48. The transponder assemblies may be put in place at the respective stations A and B simply by dropping them over the side of ship 1, for example. Transponders 32, 46 emit pulses of sonic energy when interrogated by the shipborne device 5 and may be spaced, for example, about one half a mile or more apart. According to the present invention, there is no need to know in advance precisely their separation, so that time-consuming and costly surveying is beneficially avoided.

It will be understood that the locations of a wide variety of types of submersible vessels or other devices may be determined or monitored according to the present invention, such as vessels or other support means involving search for undersea minerals or for petroleum exploration, construction of drilling equipment, under-sea pipe line installation or inspection, and the like. The under-sea vessel position may be controlled through forces applied by the tethering cable 3 in cooperation with conventional depth control apparatus aboard the tethered vessel, for example, for many exploration or monitoring purposes. In the laying of under-sea pipe line, motion of the tethered or support device may be alternatively or additionally constrained to follow the pipe line itself as a guiding track as the pipe is laid.

For communication with surface ship 1 and transponders 32, 46, under-sea vessel 30 or other support means is equipped at Station C with a conventional transponder 19 generally similar to transponders 32, 46 and with a receiver hydrophone set 31. In this manner, there is one-way acoustic pulsed carrier communication via the respective sonic beams 34, 35 from transponders 32, 46 at Stations A, B through the sea water to respective receiver hydrophones 31 at Station C. On the other hand, there is two way pulsed carrier acoustic communication through sea water between the shipborne interrogatior-receiver 5 at Station S and the transponders 32, 46 at the respective Stations A and B. There is two way pulsed sonic communication through sea water between interrogator-receiver 5 at Station S and transponder 19 at Station C. A further important communication path extends to interrogator-receiver 5 at Station S from hydrophone set 31 at Station C. Such a path is provided by at least a pair of electrically insulated leads 3a, 3b inserted in armored water-proof relation within tether cable 3 in the conventional manner.

Figure 2:
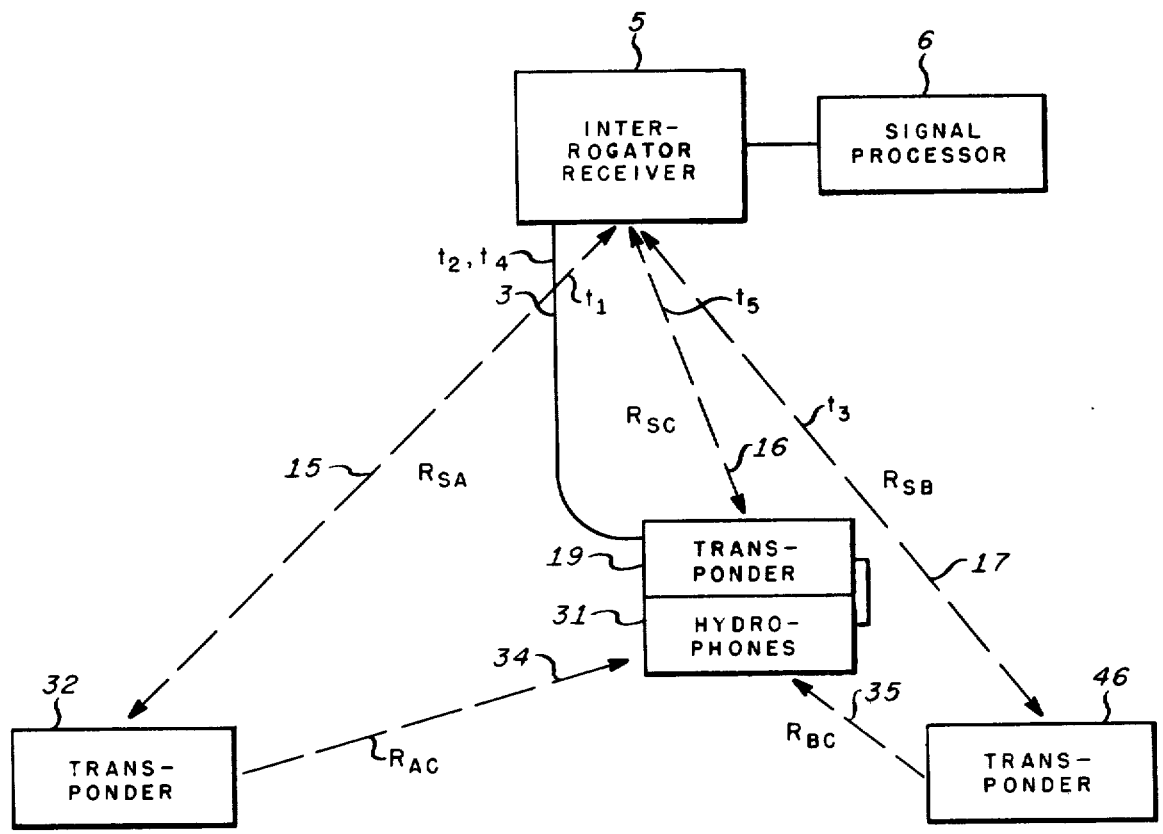
FIG. 2 is a block diagram of the basic transponder system.
Figure 3:
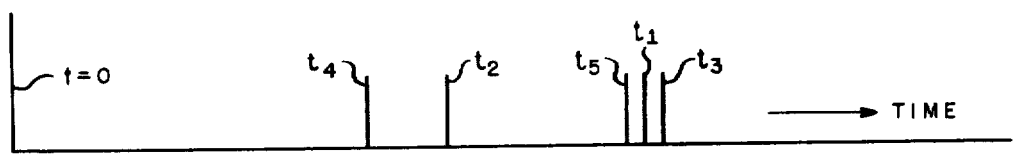
FIG. 3 is a timing chart useful in explaining the operation of the system of FIGS. 1 and 2.

As is illustrated in FIGS. 1, 2, and 3, operation of the system begins when the shipborne interrogator-receiver 5 emits an acoustic pulse of carrier frequency $f_0$ at time zero. Propagating downward, this original pulsed wave moves toward sea bottom 48 and, just before arrival there, triggers distinctive carrier reply pulses from the two bottom-located acoustic transponders 32, 46 at the respective Stations A, B and also triggers a response from transponder-receiver 19 at Station C on the tethered vessel. At some consequently later time $t_1$, a reply on carrier $f_1$ from the transponder 32 (Station A) is received over path 15 by the receiver of ship's interrogator 5 (Station S). At time $t_2$, the same reply has propagated along sea water path 34 to hydrophone set 31 and has been thereby transmitted substantially instantaneously over an electrical lead 3a within tethering cable 3 to the receiver of the surface ship's interrogator 5.

Now, at time $t_3$, the pulsed reply on carrier $f_3$ from transponder 46 at Station B is received directly via path 17 at interrogator-receiver 5. At time $t_4$, the same reply is received via path 35 and lead 3b at ship's interrogator 5. At time $t_5$, a direct pulsed carrier reply from transponder 19 at Station C is received at the receiver 5 of the support ship 1 via acoustic path 16. One of many possible timing sequences of arrival of replies at interrogator 5 is shown in FIG. 3; such pulse sequences may be received by device 5 and are applied to signal processor 6 which may, for example, comprise conventional counter-timer circuits started at time zero by the interrogating pulse. The successive time intervals would then be read out at times $t_1, t_2, \ldots, t_n$ using the time of occurrence of each of the successive received carrier pulses, for example, to strobe the counter and its display. Signal processor 6 may take other forms, as will be further described. It will be understood that the interrogator 5 in FIG. 2 may be caused to emit only a single pulse by manual command or that discontinuous or continuous pulse train emission may be used accordingly within the scope of the invention.

It will be observed from FIGS. 1 and 2 that Stations A, B, C, and S and acoustic paths 15, 16, 17, 34, 35 have associated respective spacings or ranges such as $R_{SA}$, $R_{SB}$, $R_{SC}$, $R_{AC}$, and $R_{BC}$. It will be seen that the several ranges may be determined by multiplying the elapsed time between transmission at time zero and the receipt of a reply pulse by the applicable value of the velocity of propagation of the signal through sea water. For example, the length or range $R_{SA}$ of path 15 is one half the propagation velocity $C_1$ multiplied by the time $t_1$, or:

$$R_{SA} = C_1 t_1 / 2 \quad (1)$$

where $R_{SA}$ may be called the slant range from the surface ship 1 to the sea bottom transponder 32 at Station A. In a similar manner, two further equations are evolved:

$$R_{SB} = C_1 t_3 / 2 \quad (2)$$

$$R_{SC} = C_1 t_5 / 2 \quad (3)$$

where $R_{SB}$ is the slant range from the surface ship 1 to the sea bottom transponder 46 at Station B, while $R_{SC}$ is the slant range from surface ship 1 to the submerged vessel C. It will be understood that the propagation velocity value used in Equations (1), (2), and (3) is a weighted average value of the propagation velocity of sound at the carrier frequency employed, based upon the particular velocity-depth profile between the sea surface 5 and its bottom 48. Such a modified value $C_1$ is employed because the paths 15, 16, and 17 include the major portion of the total vertical sea profile, even though FIG. 1, which is drawn at a somewhat distorted scale for the sake of clarity, may not necessarily appear to suggest such. In any event, the weighted and averaged values of the propagation velocity of sound in a typical sea profile may be derived, as is well known, from previously generated data of water temperature, salinity, or density as a function of depth below theocean surface, or directly with a velocimeter, the latter method being preferred. The method, whereby such values are derived are well established in the art and their specific details form no necessary part of the present invention.

Equations (1), (2), and (3) assume that there is no delay between the respective interrogations of transponders 32, 46, 19 and their consequent replies. However, there are built-in fixed delays characteristic of each of the transponders that are readily measurable in the factory. If the respective delays are $\Delta t_A$, $\Delta t_B$ and $\Delta t_C$, then Equations (1), (2), and (3) should be revised to read:

$$R_{SA} = \frac{C_1}{2}(t_1 - \Delta t_A) \quad (1A)$$

$$R_{SB} = \frac{C_1}{2}(t_3 - \Delta t_B) \quad (2A)$$

$$R_{SC} = \frac{C_1}{2}(t_5 - \Delta t_B) \quad (3A)$$

Two further ranges must be calculated; one is $R_{AC}$, the slant range from the submersible vessel 30 to the sea bottom transponder 32 at Station A. The other is $R_{BC}$, the slant range from submersible 30 to sea bottom transducer 46 at station B. The slant range $R_{AC}$ may be calculated by multiplying the time of travel of the sonic energy from transponder 32 to hydrophone set 31 by the velocity of propagation $C_2$. Note that $C_2$ is the value of the propagation velocity measured close to the sea bottom and is substantially constant over the area and time involved. The value of $C_2$ can simply be measured by a velocimeter aboard the submersible vessel 30. The time of arrival of the acoustic signal from transponder 32 at hydrophone set 31 is $t_2$. The time of transmission from transponder 32 is the time at which the interrogating pulse from interrogator 5 arrives at transponder 32 plus the transponder delay. This may be quantified as:

$$\frac{(t_1 - \Delta t_A)}{2} + \Delta t_a$$

Thus, a measure of $R_{AC}$ may be represented by the equations:

$$R_{AC} = C_2 \left[ t_2 - \left( \frac{t_1 - \Delta t_A}{2} + \Delta t_A \right) \right] \quad (4)$$

or:

$$R_{AC} = C_2 \left( t_2 - \frac{t_1}{2} - \frac{\Delta t_B}{2} \right)$$

In a similar way, a measure of $R_{BC}$ may be calculated by:

$$R_{BC} = C_2 \left( t_4 - \frac{t_3}{2} - \frac{\Delta t_B}{2} \right) \quad (5)$$

It will become apparent that the several Equations (1A), (2A), (3A), (4), and (5) may be instrumented employing known computer components and that different techniques may be selected to provide useful solutions of them for practicing the novel method and that these various techniques will therefore fall within the scope of the present invention.

It will be further evident by inspection that the computations of all of the apparatus described herein may be accomplished by any of several known methods, including the use of a cooperative assembly of known analog or digital data processing or computing circuits or hybrids of such systems. For example, the several equations involve simple arithmetic operations such as addition, subtraction, multiplication, division and the like. Many examples of both analog and digital computation elements are available in the prior art for accomplishing such computer operations and it is well known that they may readily be coupled in cooperative relation for attaining various results. It is furthermore evident that a conventional general purpose digital or analog computer may be employed for the purpose. It is obviously well within the ordinary skill of digital computer programmers to process the novel equations discussed above, to create flow charts, and to translate the latter into computer routines and subroutines for solution of such equations along with a compatible computer language for processing input data and instructions to produce outputs directly useful for application, for example, in a standard display or control device.

Figure 4:
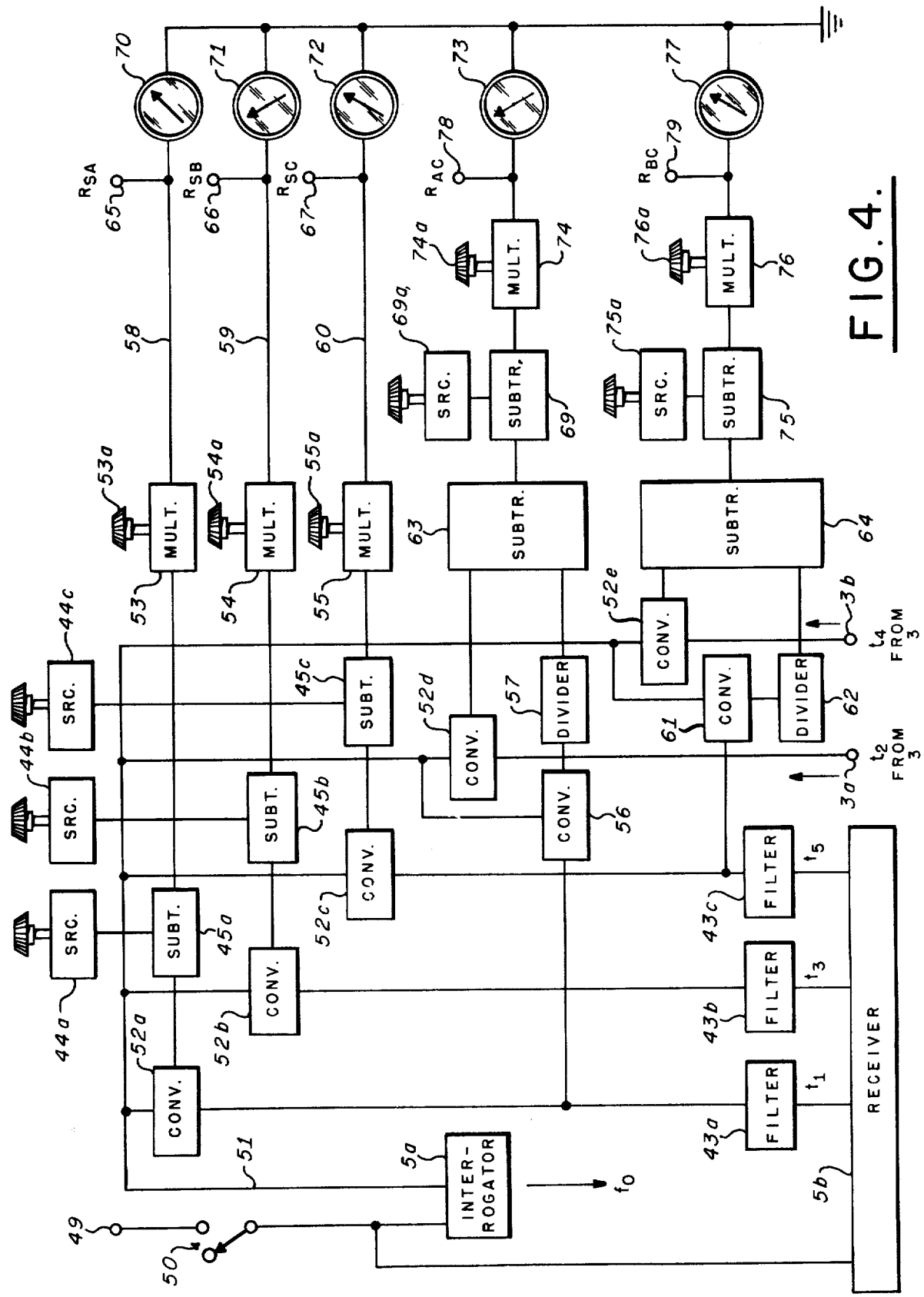
FIG. 4 is an electrical block diagram of the system on board the surface ship for computing the ranges shown in FIG. 2.

For example, FIG. 4 represents a way of practicing the particular steps of the invention as defined in the aforementioned Equations (1A), (2A), (3A), (4), and (5); here, elements 5a and 5b now represent the separated Station S interrogator and receiver parts of interrogator-receiver 5 of FIGS. 1 and 2. Assume that closure of switch 50 energizes elements 5a and 5b by power supply 49, causing interrogator 5a to transmit a single sonic pulse of carrier f₀ at time zero. A corresponding electrical time reference pulse at time zero is coupled via lead 51 in parallel to inputs of a series of similar converters 52a through 52e. Receiver or receivers 5b convert the received sonic pulses at f₁, f₃, and f₅ to electrical pulsed carriers in the conventional manner, so that one of each of these resultant carrier signals is selectively passed by narrow pass band filters 43a, 43b, or 43c. Signals of pulsed carrier frequencies f₁ and f₂ generate separate pulse responses in leads 3a, 3b of cable 3 for similar use in the respective converters 52d, 52e.

The three pulse signals t₁, t₃, t₅ passing filters 43a, 43b, 43c go to corresponding converters 52a, 52b, 52c along with the time reference pulse of lead 51. Converter 52a, for example, may be a conventional converter device like those widely used in the radar and sonar arts to convert the time difference between two input pulses into an analog voltage level representing range. Sample-and-hold circuits may be incorporated in this and the remaining converters so that a constant analog voltage output is assured until, for example, the hold circuit is discharged, as by a conventional time sensitive switching circuit. Converters 52d, 52e operate similarly, using as inputs the respective pulses t₂, t₄ on leads 3a, 3b. Thus, in converters 52a through 52e, the times between the time zero reference pulse of lead 51 and of receipt of respective ones of the five pulses t₁–t₅ are converted, for example, into analog unidirectional signals of amplitudes corresponding to the various time intervals.

Converter 52a uses pulse t₁ to generate as an output a value representative of $R_{SA}$, as defined by Equation (1A), on output terminal 65. For this purpose, the converted signal is applied to subtracter 45a, wherein a fixed signal level from source 44a representative of $\Delta t_A$ is subtracted from the signal representing t₁. The compensation delay value $\Delta t_A$ is normally a fixed delay value determined by the inherent nature of transponder 32 at Station A and is set into the system as a permanent manual adjustment of the magnitude of the fixed signal supplied by source 44a. The output of subtracter 45a is coupled to a conventional multiplier 53; multiplier 53 has a manual adjustment 53a whereby the value of the multiplier $C_1$ may set in; $C_1$ may readily be derived from predetermined published values, for example. Adjustment 53a may, for example, change the gain of an amplifier within multiplier 53. The control 53a may be left without readjustment for periods of time where the sea profile is found not to change excessively. The output signal on lead 58 and at terminal 65 is representative of $R_{SA}$ and its amplitude may be viewed on a conventional electrical display or meter 70. In an analogous manner, the quantities $R_{SB}$ and $R_{SC}$ of the respective equations (2A) and (3A) may be derived. The value $R_{SB}$ is derived using converter 52b and input pulses t₃, subtracter 45b and $\Delta t_B$ source 44b, and multiplier 54 to provide the desired output at terminal 66 and meter 71. Finally, the value representative of $R_{SC}$ is derived using converter 52c and input pulses t₅, subtracter 45c and $\Delta t_B$ source 44c, and multiplier 55 to provide the desired output at terminal 67 and meter 72.

Equations (4) and (5) are instrumented using the apparatus following converters 52d and 52e. For example, converter 52d accepts as inputs the time zero reference pulse from lead 51 and the t₂ pulse arriving over a lead 3a associated with cable 3, again producing a continuous output signal representative of the time difference of the two input pulses. A similar cooperating converter 56 similarly yields a continuous output signal representative of the time difference between the time zero pulse and the t₁ pulse. The converter 56 signal is then divided in half in a conventional divider 57 and the outputs of converter 52d and of divider 57 are applied to a conventional subtracter 63. Thus a signal representative of $$t_2 - \frac{t_1}{2}$$

is produced. The compensation delay value $\Delta t_A/2$, representative of one half of the inherent delay in transponder 32 at Station A, is generated by the manually adjusted source 69a and is subtracted from the output of subtracter 63 by subtractor 69, yielding the three terms of Equation (4) at the output of subtractor 69. The latter output is then multiplied in multiplier 74, according to the predetermined value of $C_2$, adjustment 74a having been set in accord with the measured value of $C_2$. The desired output, which is a measure of $R_{AC}$ as expressed by Equation (4), is found at terminal 78 and may be read from display 73.

The assembly for and method of measuring $R_{BC}$ is similar to that for measuring $R_{AC}$. Converter 52e accepts as inputs the zero time reference pulse from lead 51 and the $t_4$ pulse arriving over a second lead 3b associated with cable 3, providing a continuous output signal representative of the time difference of the two input pulses. A cooperating converter 61 similarly yields a continuous output signal representative of the time difference between the time zero pulse and the $t_3$ pulse. The converter 61 output signal is then divided in half in a conventional divider 62 and the outputs of converter 52e and of divider 62 are applied to a conventional subtracter 64. Thus, a signal representative of $t_4 - (t_3/2)$ is produced. The compensation delay value $\Delta t_B/2$, representative of one half of the inherent delay in transponder 46 at Station B, is generated by the manually adjusted source 75a and is subtracted from the output of subtracter 64 by subtractor 75, yielding the three terms of Equation 4 at the output of subtracter 75. The latter output is then multiplied in multiplier 76, according to the predetermined value of $C_2$. Adjustment 76a is manually set in accord with the previously measured value of $C_2$. The desired output, which is the measure of $R_{BC}$ as expressed by Equation (5), is found at terminal 79 and may be read from display 77. The five values represented by Equations (1A), (2A), (3A), (4), and (5) appear on the respective terminals 65, 66, 67, 78, and 79 for use in other utilization or signal processing means or may be presented directly on appropriate displays, such as by the respective displays 70 through 73 and 77. The several displays are illustrated as simple moving pointer electrical meters, but it will be understood that other types of displays, such as conventional bright numerical displays, may be substituted therefor.

Figure 5A:
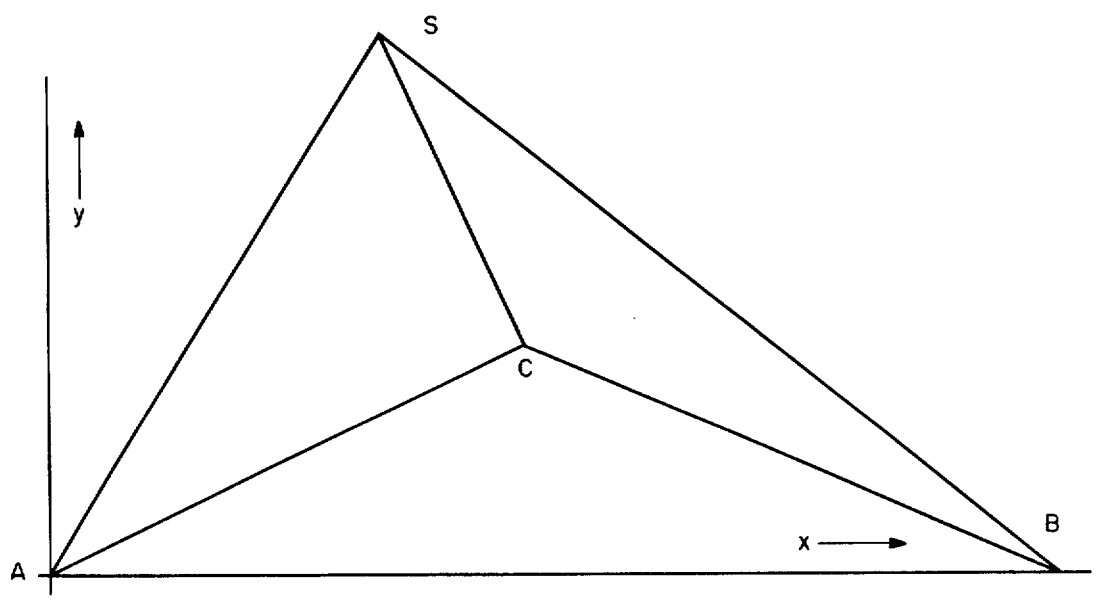
FIGS. 5A, 5B and 5C are location plots in horizontal x, y coordinates attached to the base line between the two sea bottom transponders A and B.

In order to determine the relative positions of the submersible vessel 30 and the surface ship 1, it is convenient to resolve the several slant range values defined in FIG. 1 and by Equations (1A) through (5) into the horizontal plane of the ocean's surface. Thus, the vehicle 30 may ultimately be located with respect to surface ship 1 in Cartesian coordinates x, y, and z, where x and y are horizontal off sets and z is the vertical coordinate. In this manner, FIG. 5A shows the projection into the horizontal plane of the slant range values of FIG. 1. In order actually to resolve the slant range measures, it is necessary to know the depths $D_C$, $D_A$, $D_B$ of each of the transponders 30, 32, 46 at the respective Stations C, A, and B.

Figure 11:
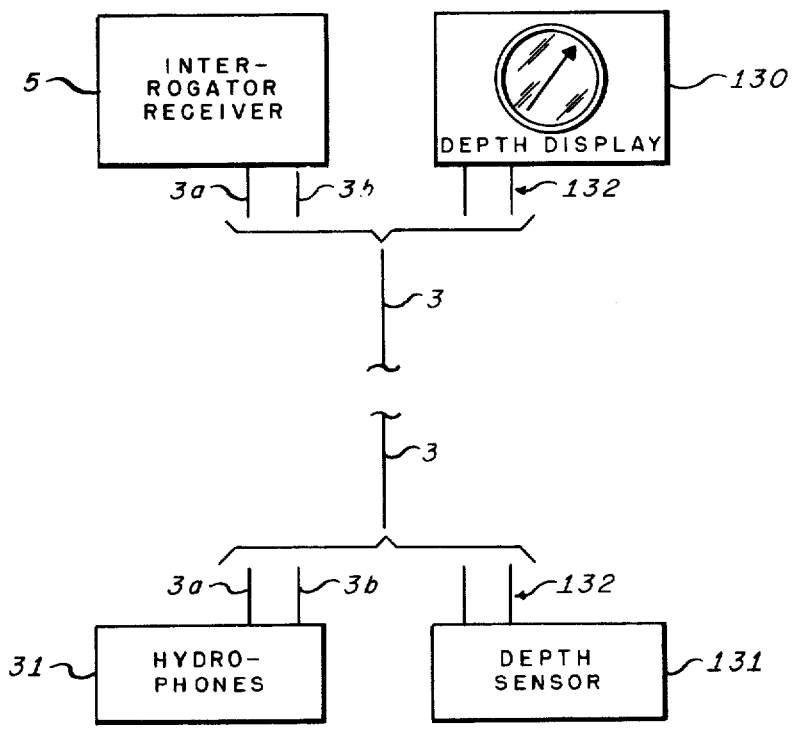
FIG. 11 is an electrical block diagram of further apparatus used in cooperation with that of FIG. 4.

The depth $D_C$ of transponder 19 at the submersible 30 at Station C may be determined as in FIG. 11 by using a conventional pressure depth sensor 131 mounted on the submersible 30 with its output data telemetered via electrical leads 132 up within the tethering cable 3 to the support ship 1. Leads 132 may be installed within the tether cable 3 in the manner previously described with respect to electrical leads 3a, 3b between hydrophones 31 and converters 52d, 52e of FIG. 4. The depth measure $D_C$ is supplied on ship 1 to a conventional depth meter display such as display 130 of FIG. 11, and may be additionally directly coupled to signal processor 6 of FIG. 2.

As noted, the depths $D_A$ and $D_B$ of the sea bottom transponders 32 and 46 at the respective Stations A and B must be known; in general, these depths may differ somewhat. The depths may be determined in either of two ways. For example, if the transponder assemblies are deployed from a surface ship, their depths may be determined in the conventional way using that ship's fathometer, using the propagation velocity $C_1$, and subtracting the known minor height of the transponder itself above the sea bottom 48. This relatively small height is due to the presence, for example, of anchor 36, float 33, and their interconnections. On the other hand, where the sea bottom transponder assemblies are deployed, for instance by the submersible 30 itself, their depths may be determined most easily by maneuvering the submersible vessel 30 along side each of the transponders 32, 46 and noting the depth of the submersible on display 130.

Referring to FIG. 5A, a plan view of the desired projection of the several slant ranges is illustrated as including straight line components $\overline{SA}$, $\overline{SB}$, $\overline{SC}$, $\overline{AC}$, and $\overline{BC}$ respectively corresponding to slant ranges $R_{SA}$, $R_{SB}$, $R_{SC}$, $R_{AC}$ and $R_{BC}$. Components $\overline{SA}$, $\overline{SB}$, and $\overline{SC}$ may be obtained by use of the respective Equations (6), (7), and (8):

$$\overline{SA} = (R_{SA}^2 - D_A^2)^{\frac{1}{2}} \qquad (6)$$

$$\overline{SB} = (R_{SB}^2 - D_B^2)^{\frac{1}{2}} \qquad (7)$$

$$\overline{SC} = (R_{SC}^2 - D_C^2)^{\frac{1}{2}} \qquad (8)$$

Components $\overline{AC}$ and $\overline{BC}$ are derived from similar respective Equations (9) and (10):

$$\overline{AC} = [R_{AC}^2 - (D_A - D_C)^2]^{\frac{1}{2}} \qquad (9)$$

$$\overline{BC} = [R_{BC}^2 - (D_B - D_C)^2]^{\frac{1}{2}} \qquad (10)$$

A major aspect of the present invention lies in its ability to measure the position of submerged vessel 30 relative to the surface support ship 1 without the need of having previously made a difficult and time-consuming survey of the precise horizontal distance or base line between the transponder Stations A and B. Accordingly, the invention provides instrumentation for performing a series of calculations to determine the respective positions C and S of submerged vessel 30 and of surface ship 1 in a coordinate system defined by the respective transponder 32 and 46 disposed at Stations A and B. The origin for the new coordinate system is arbitrarily placed at transponder 32, with x-axis horizontal values increasing positively along the line A-B passing through transponder Stations A and B. As is also seen in FIG. 5A, y-axis horizontal values increase positively from Station A perpendicular to line A-B toward the top of the figure. The vertical z-axis passes through Station A and is positive going toward the ocean bottom 48 and thus through the plane of the drawing.

Figure 6:
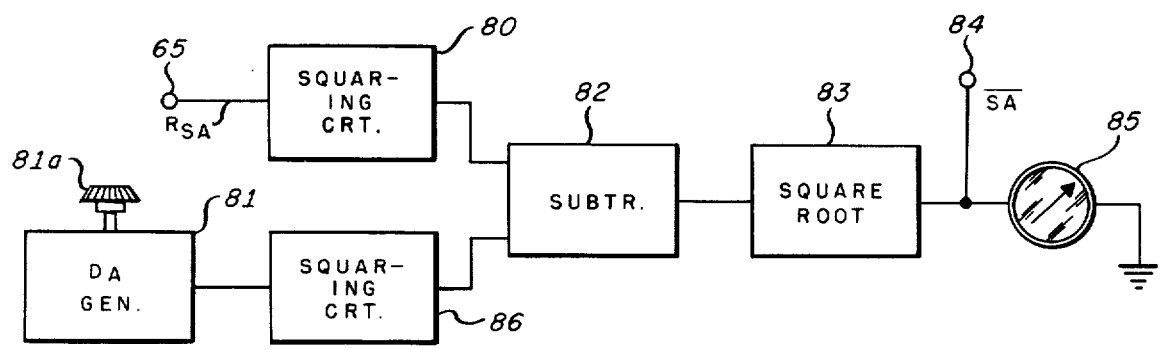
FIGS. 6 through 10 are electrical block diagrams of apparatus for deriving ranges in the coordinate system of FIG. 5A.

The triangles SAC and SBC in FIG. 5A are completely defined, since the lengths of the three sides $\overline{SA}$, $\overline{AC}$, $\overline{SC}$, $\overline{BC}$, and $\overline{SB}$ of each of the two triangles are already known from the solutions represented by Equations (6) through (10). To provide useful outputs representative of the values $\overline{SA}$, $\overline{AC}$, $\overline{SC}$, $\overline{BC}$, and $\overline{SB}$, the analog, digital, or hybrid apparatus of FIG. 6 through 10 may be employed. In FIG. 6, for example, the value of $R_{SA}$ on terminal 65 (seen also in FIG. 4) is supplied through squaring circuit 80. In a similar manner, the bottom transponder depth $D_A$ is squared by circuit 86; $D_A$ may be supplied by a unidirectional voltage generator 81 which may include a stable voltage source and a calibrated manually adjustable (81a) potentiometer, for example. The functions of elements 81 and 86 may be combined if an appropriate functional potentiometer is employed.

Figure 7:
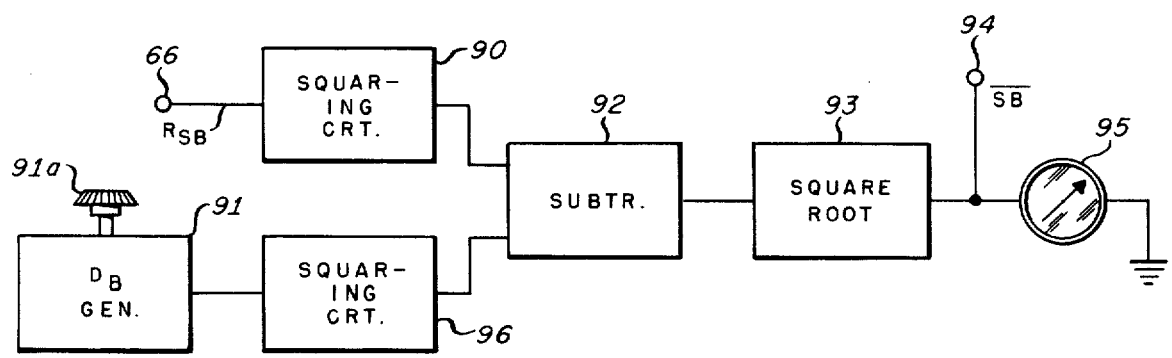
Figure 8:
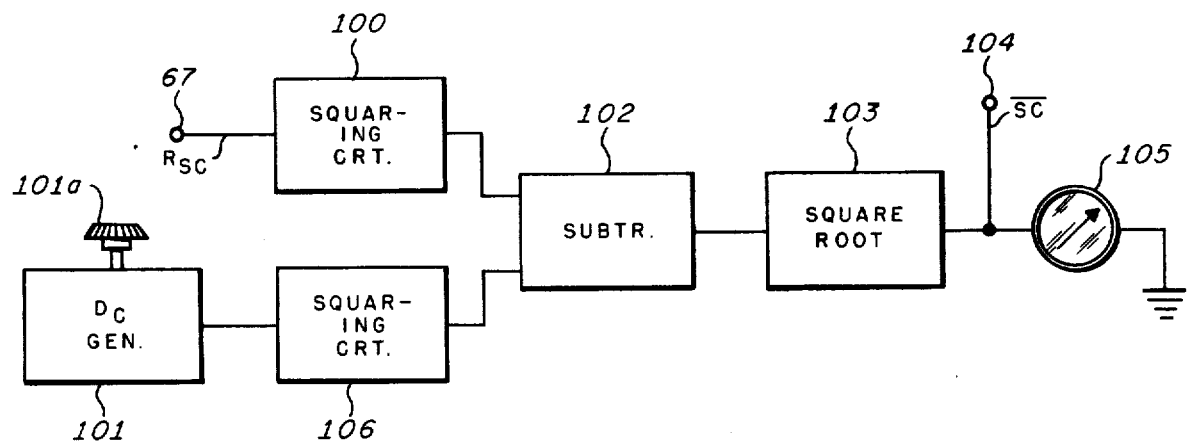

The value $D_A{}^2$ is then subtracted from the value of $R_{SA}{}^2$ in subtracter circuit 82. The real square root is then taken of the resultant difference value by the conventional square root circuit 83, whereby the value $\overline{SA}$ is yielded at terminal 84 and is indicated by display 85. The latter is shown as a simple electrical meter, but other known displays may readily be used. FIGS. 7 and 8 illustrate circuits similar to that of FIG. 6 for performing computations on different but analogous input signals.

In FIG. 7, the value of $R_{SB}$ on terminal 66 (seen also in FIG. 4) is supplied through squaring circuit 90. In a similar manner, the bottom transponder depth $D_B$ of generator 91 is squared by circuit 96. The value $D_B{}^2$ is subtracted from the value of $R_{SB}{}^2$ in subtracter circuit 92. The real square root is taken of the difference value by the conventional square root circuit 93, whereby the value $\overline{SB}$ is yielded at terminal 94 and is indicated by display 95. Again, the latter is shown as a simple electrical meter, but other known displays may readily be used. Finally, in FIG. 8, the value of $R_{SC}$ on terminal 67 (seen also in FIG. 4) is supplied through squaring circuit 100. In a similar manner, the bottom transponder depth $D_C$ value of generator 101 is squared by circuit 106. The value $D_C{}^2$ is subtracted from the value of $R_{SC}{}^2$ in subtracter circuit 102. The real square root is taken of the difference value by square root circuit 103, whereby the value $\overline{SC}$ is yielded at terminal 104 and is indicated by display 105. The latter is again shown as a simple electrical meter. Generators 91 and 101 are similar to generator 81.

Figure 9:
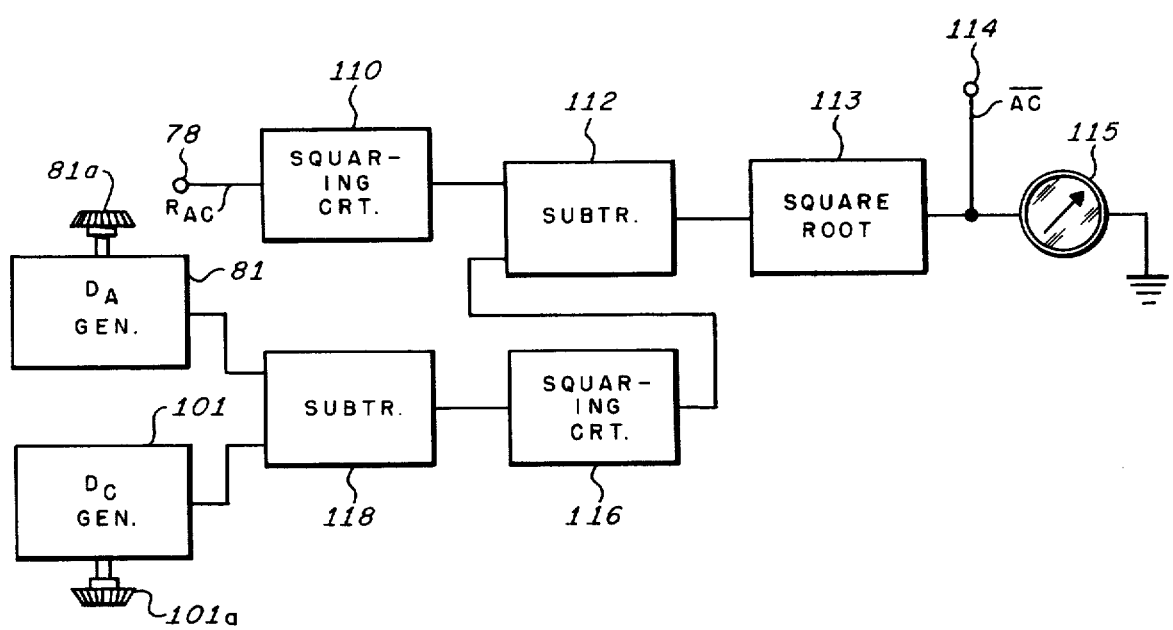
Figure 10:
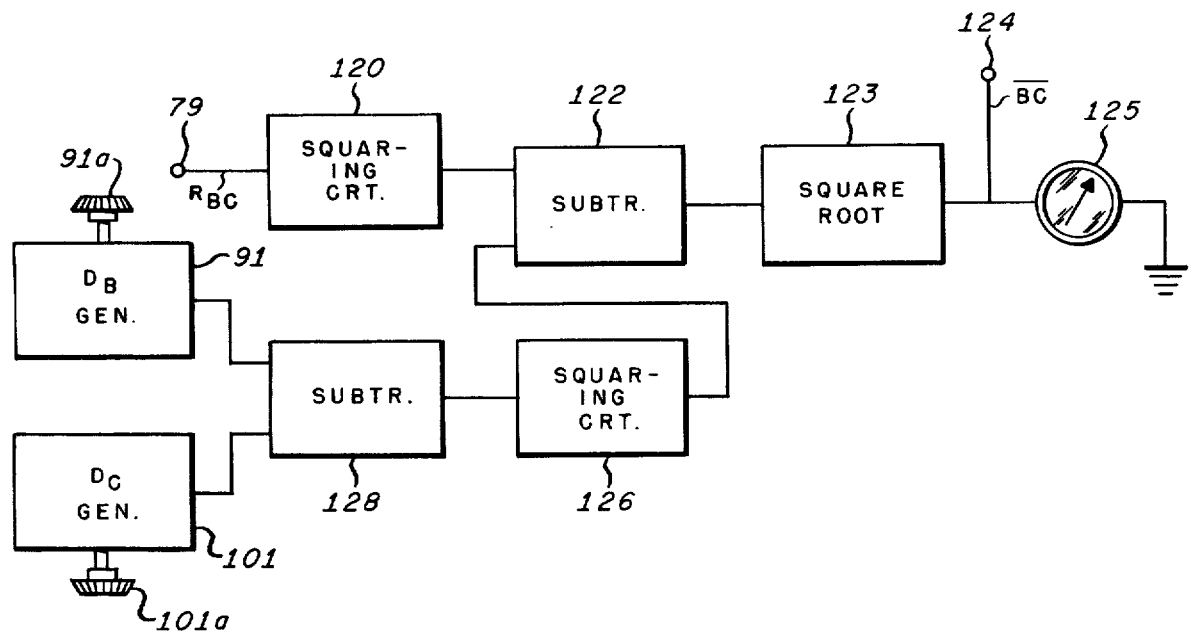

The circuits of FIGS. 9 and 10 may be employed for solving the similar Equations (9) and (10). With respect to FIG. 9, the value $R_{AC}$ found on terminal 68 in FIG. 4 is subjected to squaring circuit 110 and is then supplied to subtracter 112. The $D_C$ value of generator 101 is subtracted from the $D_A$ value of generator 81 in subtracter 118 and the difference is then squared in squaring circuit 116. Next, the output of squaring circuit 116 is subtracted from that of squaring circuit 110 within circuit 112. The difference output is now supplied to the conventional real square root circuit 113, so that the final output $\overline{AC}$ is found on terminal 114 or is supplied to display 115.

In a generally similar manner, and with respect to FIG. 10, the value $R_{BC}$ found on terminal 69 in FIG. 4 is supplied to squaring circuit 120 and is then supplied to subtracter 122. The $D_C$ value from generator 101 is subtracted from the $D_B$ value of generator 91 in subtracter 128 and the difference is then squared in squaring circuit 126. Next, the output of squaring circuit 126 is subtracted from that of squaring circuit 120 within subtracter 122. The difference output is now supplied to square root circuit 123, so that the final real output $\overline{BC}$ is found on terminal 124 or appears for observation on display 125. It will be understood that generators 81, 91, 101 in FIGS. 6 through 10 have respective manually adjustable controls 81a, 91a, 101a for inserting the appropriate depth values. Redundant generators are not necessary, though they are duplicated in FIGS. 9 and 10 as a matter of convenience.

As previously noted, triangles SAC and SBC of FIG. 5A are now completely defined, the values having been computed of $\overline{SA}$, $\overline{AC}$, $\overline{SC}$, $\overline{BC}$, and $\overline{SB}$, and also for $D_C$. It is now possible to calculate on ship 1 according to the invention the values of $x_C$ and $y_C$, the horizontal location coordinates of the submerged vessel 30 in the coordinate system represented in FIG. 5A as attached to transponder Stations A and B. Evidently, the $z_C$ position of ship 30 is its measured depth $D_C$ and its actual value is already available from display 130 of FIG. 11.

Referring again to FIG. 5A and making use of well known trigonometric relations, it is observed that the angles surrounding Station C are readily defined by:

$$\text{Angle } ACS = \cos^{-1}\left( \frac{\overline{SC}^2 + \overline{AC}^2 - \overline{SA}^2}{2\,\overline{SC}\,\overline{AC}} \right) \tag{11}$$

$$\text{Angle } SCB = \cos^{-1}\left( \frac{\overline{SC}^2 + \overline{BC}^2 - \overline{SB}^2}{2\,\overline{SC}\,\overline{BC}} \right) \tag{12}$$

$$\text{Angle } ACB = 360 - (ACS + SCB) \tag{13}$$

Accordingly:

$$\cos ACB = \cos(ACS + SCB) \tag{14}$$

from which it is now possible directly to compute the base line separation between Stations A and B without undertaking a conventional survey:

$$\overline{AB} = (\overline{AC}^2 + \overline{BC}^2 - 2\overline{AC}\,\overline{BC}\cos ACB)^{\frac{1}{2}} \tag{15}$$

Using Equations (11) through (15), it is now possible to derive the angle CAB and to then find the actual values of $x_C$ and $y_C$:

$$\text{Angle } CAB = \sin^{-1}\left( \frac{\overline{BC}\sin ACB}{\overline{AB}} \right) \tag{16}$$

$$x_C = \overline{AC}\cos CAB \tag{17}$$

$$y_C = \overline{AC}\sin CAB \tag{18}$$

Figure 12:
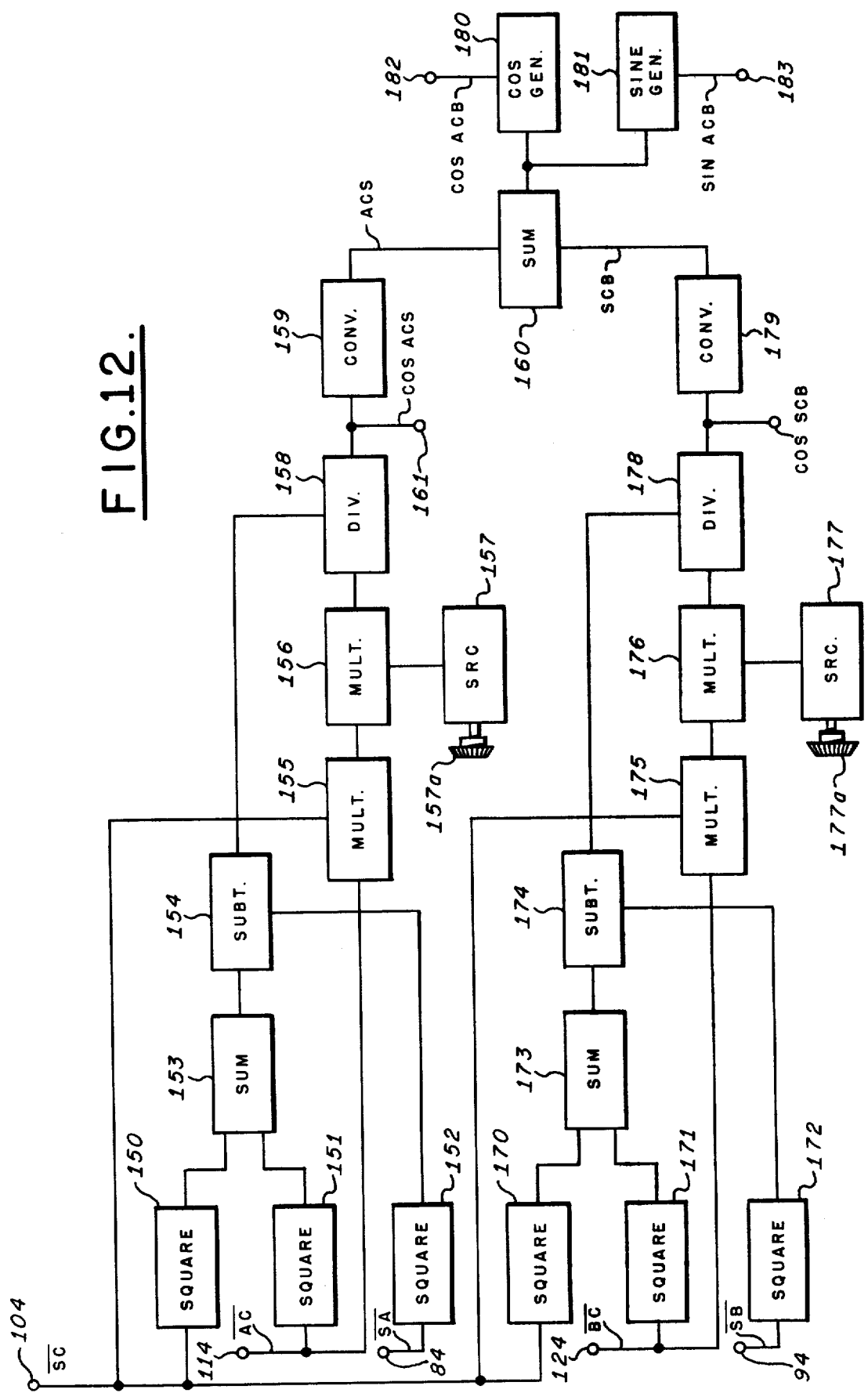
FIGS. 12, 13, and 14 are electrical block diagrams showing how coordinate values of the submersible vessel and of the surface ship are finally derived with respect to the coordinate system using base line A–B.
Figure 13:
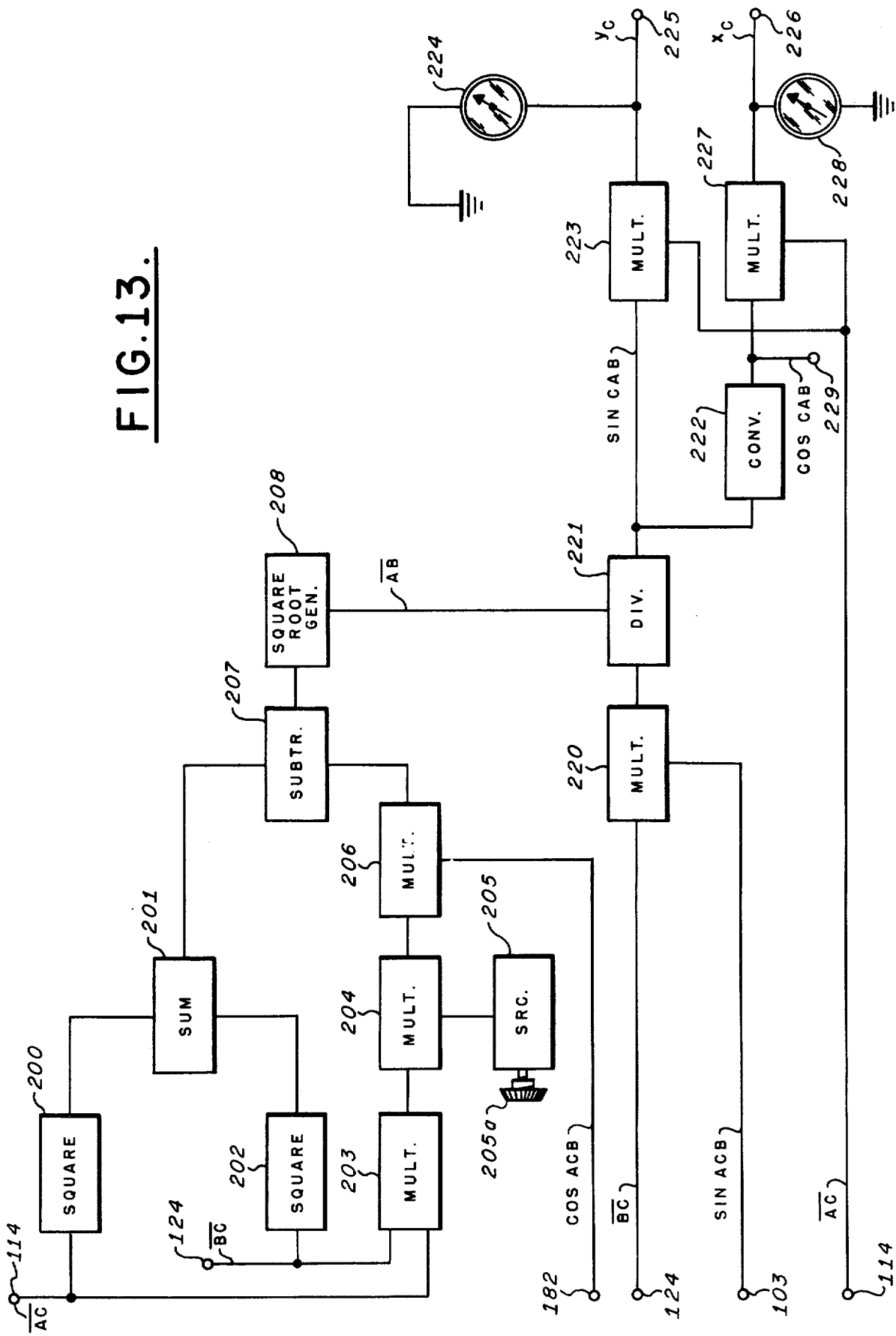

In FIG. 12, Equations (11), (12), (13), and (14) are solved to yield on the respective output terminals 182 and 183 desired values representing cos ACB and sin ACB for further use in the apparatus of FIG. 13. Inputs to FIG. 12 are previously generated representations of $\overline{SC}$, $\overline{AC}$, $\overline{SA}$, $\overline{BC}$, and $\overline{SB}$. The apparatus of the upper left part of FIG. 12 is involved in solving Equation (11); as inputs, it uses representations of $\overline{SC}$ on input terminal 104 from FIG. 8, of $\overline{AC}$ on input terminal 114 from FIG. 9, and of $\overline{SA}$ on input terminal 84 from FIG. 6. In FIG. 12, these three respective values are first squared by conventional squaring circuits 150, 151, 152. The values $\overline{SC}^2$ and $\overline{AC}^2$ are added in sum device 153. The square of $\overline{SA}$ is subtracted from the sum of $\overline{SC}^2 + \overline{AC}^2$ in subtractor 154, and the consequent output of the subtracter is supplied to one input of divider 158.

The value representing $\overline{AC}$ on terminal 114 is also coupled to multiplier 155 to be multiplied by $\overline{SC}$. The product is multiplied by two in multiplier 156 through the agency of the manually set (157a) fixed source 157. Thus, the term $\overline{SC}^2 + \overline{AC}^2 - \overline{SA}^2$ of Equation (11) is supplied to divider 158 and is divided by the term $2\ \overline{SC}\ \overline{AC}$, supplying the desired output representing cos ACS.

The similar apparatus in the lower left part of FIG. 12 is involved in solving Equation (12); as inputs, it uses representations of $\overline{SC}$ on input terminal 104 from FIG. 8, of $\overline{BC}$ on input terminal 124 from FIG. 10, and of $\overline{SB}$ on input terminal 94 from FIG. 7. In FIG. 12, these three respective values are squared by squaring circuits 170, 171, 172. The values $\overline{SC}^2$ and $\overline{BC}^2$ are added in the conventional sum circuit 173. The square of $\overline{SB}$ is subtracted from the sum $\overline{SC}^2 + \overline{BC}^2$ in subtracter 174, and the resultant output of subtracter 174 is supplied to one input of divider 178.

The value representing $\overline{SC}$ on terminal 104 is also coupled to multiplier 175 to be multiplied by $\overline{BC}$. This product is multiplied by the factor two in multiplier 176 through the agency of the manually set (177a) fixed source 177. Thus, the term $\overline{SC}^2 + \overline{BC}^2 - \overline{SB}^2$ of Equation (12) is supplied to divider 178 and is divided therein by the term $2\ \overline{SC}\ \overline{BC}$, supplying the desired output representing cos SCB.

The angles ACS and SCB are to be added to solve Equation (14), so that cos ACS and cos SCB values are first converted in conventional cosine-to-angle converters 159, 179 and are then coupled as angular values to sum device 160. In this manner, the cos ACB of Equation (14) is supplied by deriving the cosine of the sum in a conventional cosine generator 180 and appears at terminal 182 for further use in FIG. 13. The conventional sine generator 181 similarly converts the output of sum device 160 to sin ACB for further use in FIG. 13.

In FIG. 13, Equations (15), (16), (17), and (18) are solved to yield at the respective output terminals 225 and 226 the respective sought-for values $x_C$ and $y_C$. Inputs in FIG. 13 are the previously generated representations of $\overline{AC}$, $\overline{BC}$, cos ACB, and sin ACB. The apparatus in the upper left part of FIG. 13 is involved in solving Equation (15); inputs are representations of $\overline{AC}$ from terminal 114 of FIG. 9, of $\overline{BC}$ from terminal 124 of FIG. 10, and cos ACB of terminal 182 of FIG. 12.

In FIG. 13, representations of $\overline{AC}$ and $\overline{BC}$ are squared in the respective squaring circuits 200, 202, whose outputs are added by the summing device 201 to form the term $\overline{AC}^2 + \overline{BC}^2$. Secondly, the values $\overline{AC}$ and $\overline{BC}$ are multiplied together by multiplier 203. The $\overline{AC}\ \overline{BC}$ product output is multiplied in multiplier 204 by the value two supplied by the stable source 205, factory adjusted by adjustment 205a for the purpose. Finally, the term $2\ \overline{AC}\ \overline{BC}$ is multiplied by cos ACB from terminal 182 of FIG. 12 in multiplier 206. In this manner, the Equation (15) term $\overline{AC}^2 + \overline{BC}^2 - 2\ \overline{AC}\ \overline{BC}\ \cos\ ACB$ is formed and its real square root $\overline{AB}$ is then formed in the conventional square root circuit 208.

With the value $\overline{AB}$ available, the term $\overline{BC}$ sin ACB is readily computed by the apparatus of the lower left part of FIG. 13. Here, the previously derived signals representative of $\overline{BC}$ and sin ACB are multiplied one by the other in the conventional multiplier 220. The term $\overline{BC}$ sin ACB is then divided by $\overline{AB}$ in divider 221, yielding the sin CAB output term.

Equations (17) and (18) are next solved by the apparatus at the lower right of FIG. 13. Equation (18) is directly solved by using multiplier 223 to form $\overline{AC}$ sin CAB, which is the desired $y_C$ output. Further, Equation 17 is solved by the conventional sine-to-cosine converter 222 so tht cos CAB may be multiplied by $\overline{AC}$ in multiplier 227, yielding the desired term $x_C$. The terms $x_C$ and $y_C$ may be coupled directly to utilization apparatus, including displays 224 and 228. Thus, the values $x_C$ and $y_C$, defining the horizontal location coordinates of the submerged vessel 30 in the coordinate system of FIG. 5A, are known and may be read directly by an operator in plotting and directing the position of vessel 30 or may be otherwise employed, as for course and position recording purposes for future reference. Furthermore, the system is self-calibrating, and the distance between transponder Stations A and B need not be surveyed in the usual manner.

As previously observed, the invention additionally affords measures of $x_S$ and $y_S$, indicating the horizontal position of ship 1 in the same set of coordinates attached to transponder Stations A and B. The $z_S$-coordinate of the surface ship is zero, since the plane of reference of the system is arbitrariy taken as the water surface 4. In order to derive $x_S$ and $y_S$, computation begins with Equation (19). Equation (19), like the similar Equations (11) and (12), is readily set down using known trigonometric relations upon inspection of FIG. 5A:

$$\text{Angle } SAC = \sin^{-1}\left(\frac{\overline{SC}\ \sin ACS}{\overline{SA}}\right) \tag{19}$$

It is also clear from FIG. 5A that:

$$\text{Angle } SAB = CAB + SAC \tag{20}$$

and further that:

$$x_S = \overline{SA}\ \cos\ SAB \tag{21}$$

$$y_S = \overline{SA}\ \sin\ SAB \tag{22}$$

Figure 14:
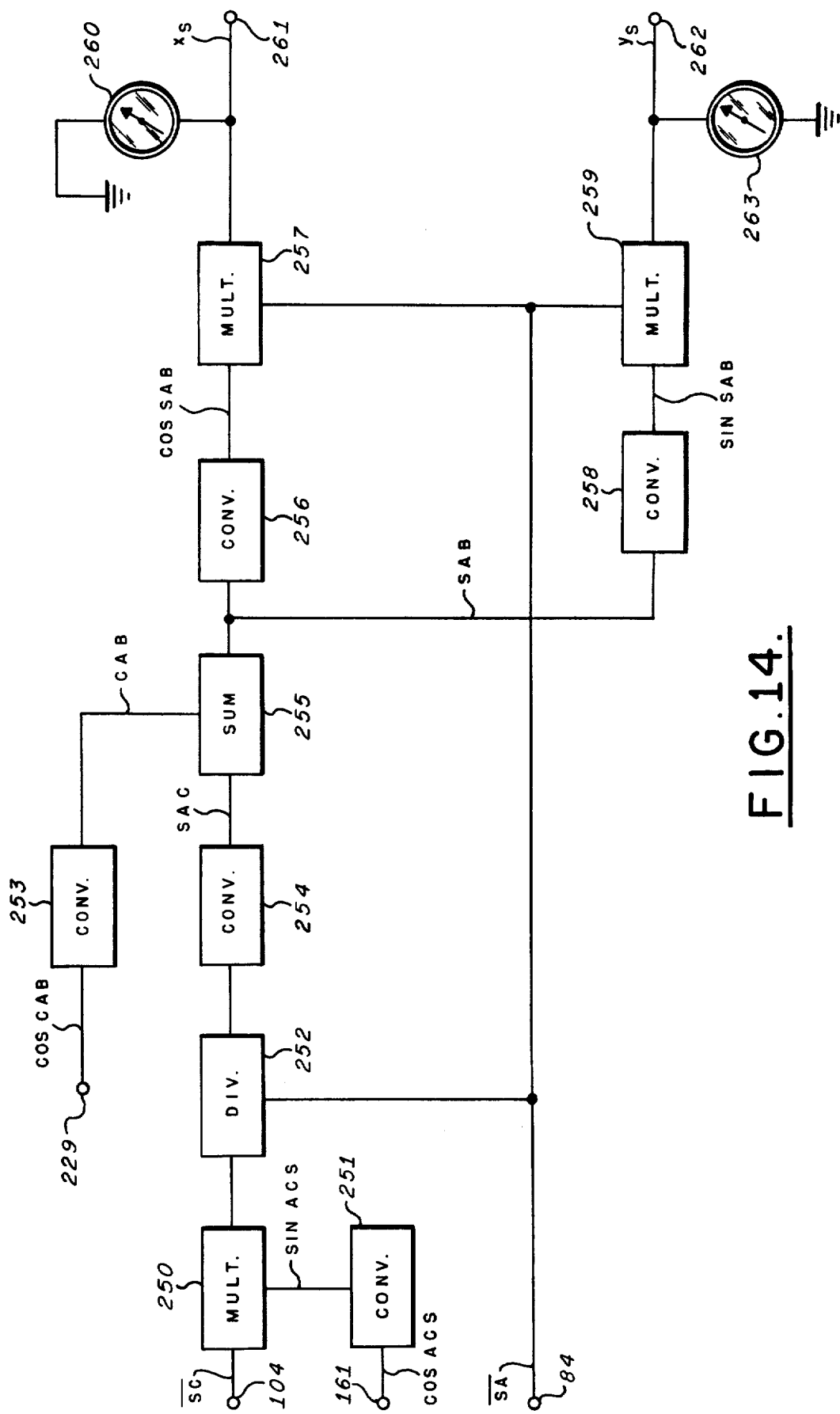

The means for solutions of Equations (19), (20), (21), and (22), shown in FIG. 14, may be generally similar to the apparatus for solution of the previous equations. The inputs of the apparatus are representations of $\overline{SC}$ found on terminal 104 of FIG. 8, of $\overline{SA}$ found on terminal 84 of FIG. 6, of cos ACS found on terminal 161 of FIG. 12, and of cos CAB found on terminal 229 of FIG. 13. As useful outputs, values representing the horizontal position coordinates $x_S$ and $y_S$ of the surface ship 1 in the coordinates represented in FIG. 5A appear at the respective terminals 261, 262 and may be applied in utilization equipment including the respective displays 260, 263.

In FIG. 14, the signal cos ACS on terminal 161 is changed in the conventional converter 251 into a signal representative of sin ACS before multiplication in multiplier 250 to form the output $\overline{SC}$ sin ACS. The latter term is then divided in divider 252 by a signal representative of $\overline{SA}$ found on terminal 89. The resultant output of divider 252 is converted to the angle value SAC in sine-to-angle converter 254, yielding the angle SAC as in Equation (19). To find angle SAB as required by Equation (20), the term cos CAB found on terminal 229 of FIG. 12 is converted in the conventional cosine-to-angle converter 253, yielding angle CAB, which angle is added in summing device to angle SAC. With angle SAB thus computed, Equations (21) and (22) are readily solved. The value $x_S$ is derived by converting the angle SAB to cos SAB in angle-to-cosine converter 256, after which it is multiplied by $\overline{SA}$ in multiplier 257 for read out on display 260, for example. The value $y_S$ is found by converting the angle SAB to sin SAB in angle-to-sine converter 258, after which it is multiplied by $\overline{SA}$ in multiplier 259 for use in display 263 or for other purposes.

There is a condition in which a certain ambiguity may arise. The positions of Stations S or C (or both) can very well be at mirror image locations with respect to those actually shown in FIG. 5A and particularly with respect to the base line A–B. This is shown in FIG. 5C where Stations S and C can also be at S' and C', producing the same computed results as before. This comes about because there are two valid solutions for Equations (11) and (12) since $\cos\theta = \cos(-\theta)$, where $\theta$ is any arbitrary angle. Thus, angle ACS from Equation (11) and angle ACB from Equation (13) can be either positive or negative. This results in either positive or negative values for the angles CAB and SAC from Equations (16) and (19), leading to either positive or negative values of $y_C$ and $y_S$ from Equations (18) and (22).

This ambiguity is not nearly as serious a problem as it might appear to be at first hand. It is quite easy to know generally on which side of base line A–B the vessels 1 and 30 actually lie. The submersible 30, when dropping transponders 32, 46 and thus determining the sites of Stations A and B, can very easily be steered always in a consistent direction from the base line, just as may the surface ship 1. Further, surface marker buoys attached to the transponders at Stations A and B will serve to yield a general indication of the disposition of base line A–B, for example. Other known expedients may be employed.

Figure 5B:
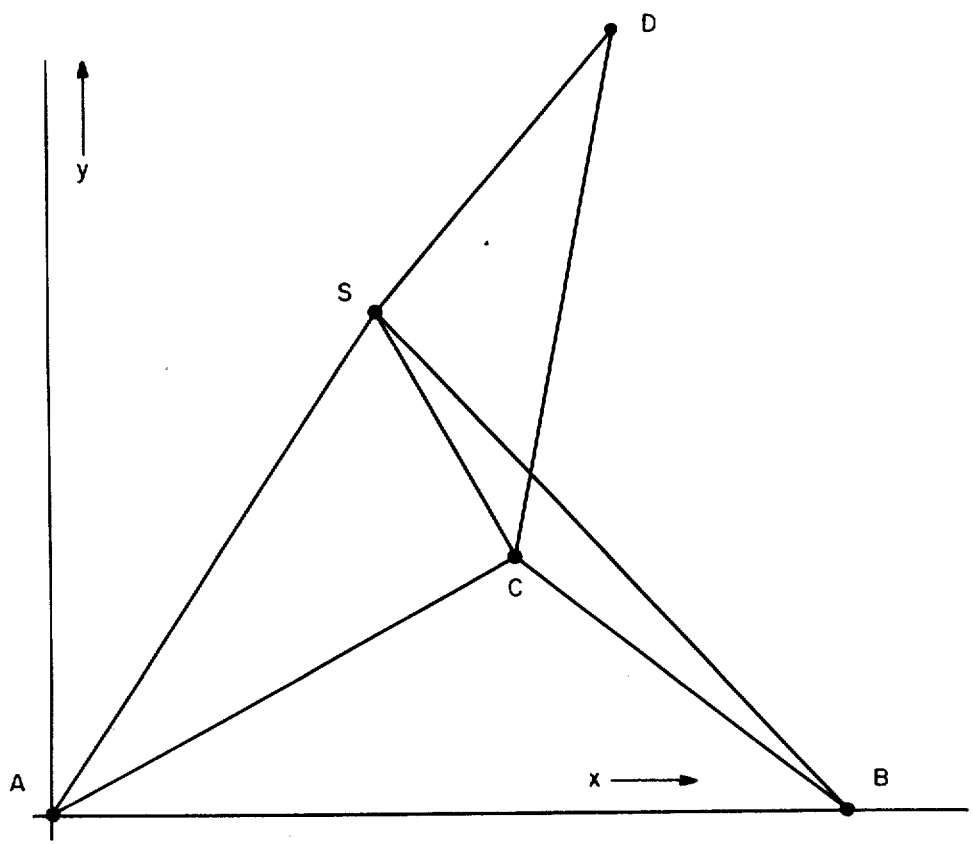
Figure 5C:
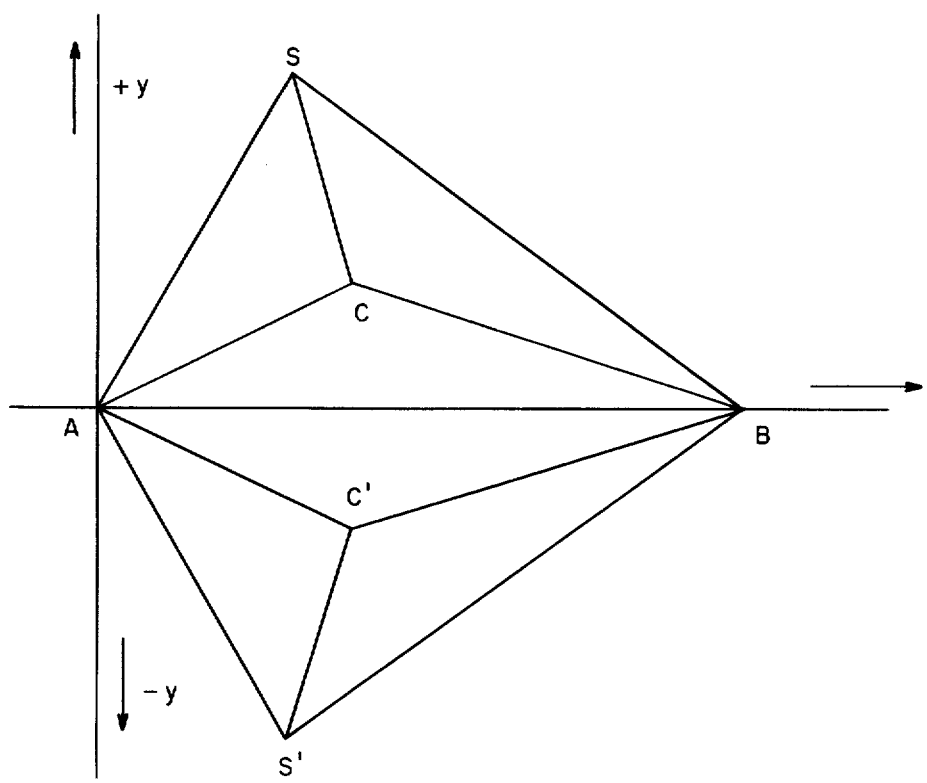

In instances in which full resolution of the ambiguity is difficult or needs to be checked, a third transponder like transponders 32 and 46 may be dropped at a third station, such as Station D in FIG. 5B. Equations (1) through (22) and the apparatus for solving them are first applied using transponder pairs at Stations A and B and then at Stations A and D. Only two pairs of calculations are needed to resolve the ambiguity, but a third redundant measuremement between Stations B and D may be made in the interest of improving accuracy through averaging the results of the three measurements, in the usual manner.

Accordingly, it is seen that the invention overcomes the difficulties and expense of prior art methods and apparatus by providing an improved acoustic position measurement system for the location of objects such as a support ship and a tethered submerged vessel by a ship borne system cooperating with a single pair of sea bottom transponders. The derived information solves equations defining the geometry and the positions of both vessels with respect to a sea bottom coordinate system based on the locations of the transponders at Stations A and B. Installation of the necessary communication components is easily effected and the tether cable for the submerged vehicle readily supports communication links between the two vessels. The system is self-calibrating, and the need for making a prior survey to determine the exact location of the sea bottom Stations A and B is removed. In the prior art, the performance of such in initial survey has proven to be expensive and time-consuming, requiring at least special surface vessels. Where a better initial survey of Stations A and B locations were required in the interest of higher accuracy, a manned submersible was also required in an operation even more costly in time and money and otherwise operationally objectionable.

While the invention has been described in its preferred embodiments, it is to be understood that the words which have been used are words of description rather than of limitation and that changes within the purview of the appended claims may be made without departure from the true scope and spirit of the invention in its broader aspects.

What is claimed is:

1. In a machine method of establishing positional data with respect to a base line disposed at a marine bottom, the steps of:
   providing first and second acoustic pulse transponder means one each at the respective ends of said base line,
   providing third acoustic pulse transponder means at support means disposed intermediate said marine bottom and a location at the associated marine surface,
   providing pulse interrogator-receiver means at said location for cooperative communication with said first, second, and third acoustic pulse transponder means by providing respective first, second and third pulse responses thereto at said interrogator-receiver means,
   providing hydrophone means at said support means responsive to said first and second acoustic pulse transponder means for providing respective fourth and fifth pulse responses at said interrogator-receiver means,
   utilizing said first, second, and third pulse responses at said location for computing the respective magnitudes of the distance vector $R_{SA}$ from said location to said first acoustic pulse transponder means, of the distance vector $R_{SB}$ from said location to said second acoustic pulse transponder means, and of the distance vector $R_{SC}$ from said location to said third acoustic pulse transponder means,
   utilizing said first and fourth pulse responses at said location for computing the magnitude of the distance vector $R_{AC}$ between said first and third acoustic pulse transponder means, and
   utilizing said second and fifth pulse responses at said location for computing the magnitude of the distance vector $R_{BC}$ between said second and third pulse transponder means.

2. The machine method described in claim 1 including the additional step of utilizing the magnitude of said distance vector $R_{SA}$ and the depth of said first acoustic pulse transponder means for computing the horizontal distance component $\overline{SA}$ with respect to said location and said first acoustic pulse transponder means.

3. The machine method described in claim 2 including the additional step of utilizing the magnitude of said distance vector $R_{SB}$ and the depth of said second acoustic pulse transponder means for computing the horizontal distance component $\overline{SB}$ with respect to said location and said second acoustic pulse transponder means.

4. The machine method described in claim 3 including the additional step of utilizing the magnitude of said distance vector $R_{SC}$ and the depth of said third acoustic pulse transponder means for computing the horizontal distance component distance $\overline{SC}$ with respect to said location and said third acoustic pulse transponder means.

5. The machine method described in claim 4 including the additional step of utilizing the magnitude of said distance vector $R_{AC}$ and the depths of said first and third acoustic pulse transponder means for computing the horizontal distance component $\overline{AC}$ with respect to said first and third acoustic transponder means.

6. The machine method described in claim 5 including the additional step of utilizing the magnitude of said distance vector $R_{BC}$ and the depths of said second and third acoustic pulse transponder means for computing the horizontal distance component $\overline{BC}$ with respect to said second and third pulse acoustic transponder means.

7. The machine method described in claim 6 including the step of providing means for substantially instantaneous transmission of said fourth and fifth responses from said hydrophone means to said location.

8. The machine method described in claim 7 including the step of utilizing said horizontal distance components $\overline{SA}$, $\overline{SC}$, and $\overline{AC}$ for computing the angle ACS between said horizontal distance components $\overline{AC}$ and $\overline{SC}$.

9. The machine method described in claim 8 including the step of utilizing said horizontal distance components $\overline{SC}$, $\overline{BC}$ and $\overline{SB}$ for computing the angle SCB between said horizontal distance components $\overline{SC}$ and $\overline{BC}$.

10. The machine method described in claim 9 including the steps of utilizing said angles ACS and SCB to provide a measure of angle ACB between said horizontal distance components $\overline{AC}$ and $\overline{BC}$ and therefrom computing the sine and cosine of angle ACB.

11. The machine method described in claim 10 including the additional steps whereby the rectangular $x_C$, $y_C$ horizontal coordinates of said support means with respect to said base line are computed, said additional steps including utilizing said horizontal distance components $\overline{AC}$ and $\overline{BC}$ and said sine and cosine of angle ACB and for additionally generating the sine and cosine of the angle CAB between horizontal distance components $\overline{AC}$ and $\overline{AB}$ for the purpose.

12. The machine method described in claim 10 including the additional steps whereby the rectangular $x_S$, $y_S$ horizontal coordinates of said location with respect to said base line are computed, said additional steps including utilizing said horizontal distance components $\overline{SC}$ and $\overline{SA}$ and said sine of the angle ACS, the angles CAB and SAC, and the sine and cosine of angle SAB.

13. The machine method described in claim 10 including the additional steps whereby the rectangular $x_S$, $y_S$ horizontal coordinates of said location with respect to said base line are computed, said additional steps including utilizing said horizontal distance components $\overline{SC}$ and $\overline{SA}$ and said cosines of the angles ACS and CAB for the purpose.

14. The machine method described in claim 1 wherein the computing of the respective magnitudes of the distance vectors $R_{SA}$, $R_{SB}$, and $R_{SC}$ includes the sub-steps of:
generating at said location respective first, second and third measures of the times of propagation of said first, second, and third pulse responses to said interrogator-receiver means from said respective first, second, and third acoustic pulse transponder means, and
multiplying said first, second, and third time measures by an adjusted propagation velocity according to the corresponding velocity-depth marine profile for computing said respective distance vectors $R_{SA}$, $R_{SB}$, and $R_{SC}$.

15. The machine method described in claim 1 wherein the computing of the magnitude of the distance vector $R_{AC}$ includes the sub-steps of:
generating at said location respective first and second measures of the times of propagation of said first and fourth pulse responses to said interrogator-receiver means from said respective first and third acoustic pulse transponder means,
determining the difference between said first and second measures, and
multiplying said difference by substantially the propagation velocity of said acoustic pulses at said marine bottom.

16. The machine method described in claim 1 wherein the computing of the magnitude of the distance vector $R_{BC}$ includes the sub-steps of:
generating at said location respective first and second measures of the times of propagation of said second and fifth pulse responses to said interrogator-receiver means from said respective second and third pulse transponder means,
determining the difference between said first and second measures, and
multiplying said difference by substantially the propagation velocity of said acoustic pulses at said marine bottom.

17. The machine method described in claim 2 wherein the computing of the horizontal distance component $\overline{SA}$ includes the sub-steps of:
generating the square of the distance vector $R_{SA}$,
generating the square of the depth $D_A$ of said first acoustic pulse transponder,
obtaining the difference between said squares, and
obtaining the real square root of said difference.

18. The machine method described in claim 3 wherein the computing of the horizontal distance component $\overline{SB}$ includes the sub-steps of:
generating the square of the distance vector $R_{SB}$,
generating the square of the depth $D_B$ of said second acoustic pulse transponder,
obtaining the difference between said squares, and
obtaining the real square root of said difference.

19. The machine method described in claim 4 wherein the computing of the horizontal distance component $\overline{SC}$ includes the sub-steps of:
generating the square of the distance vector $R_{SC}$,
generating the square of the depth $D_C$ of said third acoustic pulse transponder,
obtaining the difference between said squares, and
obtaining the real square root of said difference.

20. The machine method described in claim 5 wherein the computing of the horizontal distance component $\overline{AC}$ includes the sub-steps of:
obtaining the difference between the depths $D_A$ and $D_C$ of said first and third acoustic pulse transponders,
obtaining the square of said difference,
obtaining the square of the magnitude of said vector $R_{AC}$,
obtaining the difference between said squares, and
obtaining the real square root of said difference between said squares.

21. The machine method described in claim 6 wherein the computing of the horizontal distance component $\overline{BC}$ includes the sub-steps of:
obtaining the difference between the depths $D_B$ and $D_C$ of said second and third acoustic pulse transponders,
obtaining the square of said difference,
obtaining the square of the magnitude of said vector $R_{BC}$, obtaining the difference between said squares, and obtaining the real square root of said difference between said squares.

22. The machine method described in claim 8 wherein the step of computing the angle ACS includes the sub-steps of:

squaring the magnitudes of each of said horizontal distance components $\overline{SC}$, $\overline{AC}$, and $\overline{SA}$, obtaining the sum of said squares of the magnitudes of the horizontal distance components $\overline{SC}$ and $\overline{AC}$, obtaining the difference between said sum and said square of the horizontal component $\overline{SA}$, obtaining twice the product of said horizontal components $\overline{AC}$ and $\overline{SC}$, obtaining the ratio of said difference and twice said product for generating an output representative of cos ACS, and converting said output to the angle ACS.

23. The machine method described in claim 9 wherein the step of computing the angle SCB includes the sub-steps of:

squaring the magnitudes of each of said horizontal distance components $\overline{SC}$, $\overline{BC}$, and $\overline{SB}$, obtaining the sum of said squares of the magnitudes of said horizontal distance components $\overline{SC}$ and $\overline{BC}$, obtaining the difference between said sum and said square of the horizontal components $\overline{SB}$, obtaining twice the product of said horizontal components $\overline{SC}$ and $\overline{BC}$, obtaining the ratio of said difference and twice said product for generating an output representative of cos SCB, and converting said output to the angle SCB.

24. The machine method described in claim 11 wherein the step of computing the rectangular $X_C$, $Y_C$ horizontal coordinates of said support means with respect to said base line includes the sub-steps of:

obtaining the sum of the squares of said horizontal components $\overline{AC}$ and $\overline{BC}$, obtaining twice the product of said horizontal components $\overline{AC}$ and $\overline{BC}$ further multiplied by said cos ACB in he form 2 $\overline{AC}$ $\overline{BC}$ cos ACB, obtaining the difference between said sum and 2 $\overline{AC}$ $\overline{BC}$ cos ACB, obtaining the real square root of said difference, obtaining the further product of said horizontal component $\overline{BC}$ and said sine of the angle ACB, obtaining the ratio of said further product and said real square root, obtaining from said ratio the sine and cosine of the angle CAB, and multiplying said respective sine and cosine terms by said horizontal component $\overline{AC}$.

25. The machine method described in claim 13 wherein the step of computing the rectangular $x_S$ and $y_S$ horizontal coordinates of said location with respect to said base line includes the sub-steps of:

obtaining the product of said horizontal distance component $\overline{SC}$ and the sine of said angle ACS, dividing said product by said horizontal distance component $\overline{SA}$ to obtain a first output, converting said first output to the angle SAC, adding said angle SAC to said angle CAB for obtaining as a sum output the angle SAB, converting said sum output to the sine and cosine of angle SAB, and multiplying said respective sine and cosine of angle SAB by said horizontal distance component $\overline{SA}$.

26. Apparatus for establishing positional data with respect to a base line disposed at a marine bottom, said apparatus comprising:

first and second acoustic pulse transponder means one each at the respective ends of said base line, third acoustic pulse transponder means at support means disposed intermediate said marine bottom and a location at the associated marine surface, pulse interrogator-receiver means at said location for cooperative communication with said first, second, and third acoustic pulse transponder means for providing respective first, second, and third pulse responses at said interrogator-receiver means, hydrophone means at said support means responsive to said first and second acoustic pulse transponder means for providing respective fourth and fifth pulse responses at said interrogator-receiver means, first slant range computing means utilizing said first, second, and third pulse responses at said location for computing the respective magnitudes of the distance vector $R_{SA}$ from said location to said first acoustic transponder means, of the distance vector $R_{SB}$ from said location to said second acoustic pulse transponder means, and of the distance vector $R_{SC}$ from said location to said third acoustic pulse transponder means, second slant range computing means utilizing said first and fourth pulse responses at said location for computing the magnitude of the distance vector $R_{AC}$ between said first and third acoustic pulse transponder means, and third slant range computing means utilizing said second and fifth pulse responses at said location for computing the magnitude of the distance vector $R_{BC}$ between said second and third pulse transponder means.

27. The apparatus described in claim 26 additionally including means for substantially instantaneous transmission of said fourth and fifth responses from said hydrophone means to said location.

28. The apparatus described in claim 27 additionally including first horizontal distance component computer means responsive to the magnitude of said vector $R_{SA}$ and the depth of said first acoustic pulse transponder for computing the horizontal distance component $\overline{SA}$ with respect to said location and said first acoustic pulse transponder.

29. The apparatus described in claim 28 additionally including second horizontal distance component computer means responsive to the magnitude of said vector $R_{SB}$ and the dpeth of said second acoustic pulse transponder for computing the horizontal distance component $\overline{SB}$ with respect to said location and said second acoustic pulse transponder.

30. The apparatus described in claim 29 additionally including third horizontal distance component computer means responsive to the magnitude of said vector $R_{SC}$ and the depth of said third acoustic pulse transponder for computing the horizontal distance component distance $\overline{SC}$ with respect to said location and said third acoustic pulse transponder means.

31. The apparatus described in claim 30 additionally including fourth horizontal distance component computer means responsive to the magnitude of said vector $R_{AC}$ and the depths of said first and third acoustic pulse transponder means for computing the horizontal distance component $\overline{AC}$ with respect to said first and third acoustic transponder means.

32. The apparatus described in claim 31 additionally including fifth horizontal distance component computer means responsive to said vector $R_{BC}$ and the depths of said second and third acoustic pulse transponder means for computing the horizontal distance component $\overline{BC}$ with respect to said second and third pulse acoustic transponder means.

33. Apparatus as described in claim 32 including first angle computer means responsive to said horizontal distance components $\overline{SA}$, $\overline{SC}$, and $\overline{AC}$ for computing the angle ACS between said horizontal distance components $\overline{AC}$ and $\overline{SC}$.

34. Apparatus as described in claim 33 including second angle computer means responsive to said horizontal distance components $\overline{SC}$, $\overline{BC}$, and $\overline{SB}$ for computing the angle SCB between said horizontal distance components $\overline{SC}$ and $\overline{BC}$.

35. Apparatus as described in claim 34 including third angle computer means responsive to the magnitudes of said angles ACS and SCB to provide the magnitude of the angle ACB between said horizontal distance components $\overline{AC}$ and $\overline{BC}$ and therefrom computing the sine and cosine of angle ACB.

36. Apparatus as described in claim 35 including first rectangular coordinate computer means responsive to said horizontal distance components $\overline{AC}$ and $\overline{BC}$ and said sine and cosine of angle ACB for generating the rectangular $x_C$, $y_C$ horizontal coordinates of said support means with respect to said base line.

37. Apparatus as described in claim 36 wherein said first rectangular coordinate computer means is additionally responsive to said horizontal distance components $\overline{AC}$ and $\overline{BC}$ and said sine and cosine of angle ACB for generating the sine and cosine of the angle CAB between horizontal distance components $\overline{CA}$ and $\overline{AB}$.

38. Apparatus as described in claim 37 including second rectangular coordinate computer means responsive to said horizontal distance components $\overline{SC}$ and $\overline{SA}$ and said cosines of the angles ACS and CAB for generating the rectangular $x_S$, $y_S$ horizontal coordinates of said location with respect to said base line.

* * * * *